United States Patent
Zhou et al.

(10) Patent No.: US 11,956,510 B2
(45) Date of Patent: Apr. 9, 2024

(54) VIDEO PROCESSING METHOD, LIVE STREAMING PROCESSING METHOD, LIVE STREAMING SYSTEM, ELECTRONIC DEVICE, TERMINAL, AND MEDIUM

(71) Applicant: BOE TECHNOLOGY GROUP CO., LTD., Beijing (CN)

(72) Inventors: Lijia Zhou, Beijing (CN); Zhidong Wang, Beijing (CN); Xiuru Sun, Beijing (CN); Meng Guo, Beijing (CN); Hao Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 136 days.

(21) Appl. No.: 17/765,041

(22) PCT Filed: Jun. 8, 2021

(86) PCT No.: PCT/CN2021/098901
§ 371 (c)(1),
(2) Date: Mar. 30, 2022

(87) PCT Pub. No.: WO2022/022075
PCT Pub. Date: Feb. 3, 2022

(65) Prior Publication Data
US 2022/0345783 A1 Oct. 27, 2022

(30) Foreign Application Priority Data
Jul. 30, 2020 (CN) .......................... 202010753323.3

(51) Int. Cl.
*H04N 21/4788* (2011.01)
*G06F 40/279* (2020.01)
(Continued)

(52) U.S. Cl.
CPC ....... *H04N 21/4788* (2013.01); *G06F 40/279* (2020.01); *G10L 15/08* (2013.01);
(Continued)

(58) Field of Classification Search
CPC ........... H04N 21/4788; H04N 21/2187; H04N 21/23418; H04N 21/47815; H04N 21/233; H04N 21/8456; G10L 2015/088
See application file for complete search history.

(56) References Cited

U.S. PATENT DOCUMENTS

| 8,209,713 B1 * | 6/2012 | Lai | H04N 20/14 |
| 2017/0125060 A1 * | 5/2017 | Zhang | H04N 21/278 |

FOREIGN PATENT DOCUMENTS

| CN | 106878819 A | 6/2017 |
| CN | 108280155 A | 7/2018 |

(Continued)

OTHER PUBLICATIONS

China Patent Office, CN202010753323.3 First Office Action dated Jul. 6, 2022.

*Primary Examiner* — Anthony Bantamoi
(74) *Attorney, Agent, or Firm* — HOUTTEMAN LAW LLC (57) ABSTRACT

The present disclosure provides a video processing method, including: determining, according to a consulting message, a target short video corresponding to the consulting message; and pushing the target short video to a terminal sending the consulting message. The present disclosure further provides a live streaming processing method, an electronic apparatus, a live streaming system, a terminal, and a computer-readable storage medium. The video processing method can improve the user experience during a live streaming process.

11 Claims, 4 Drawing Sheets

(51) Int. Cl.
  *G10L 15/08*      (2006.01)
  *G10L 15/22*      (2006.01)
  *G10L 25/57*      (2013.01)
  *H04N 21/2187*   (2011.01)

(52) U.S. Cl.
  CPC .............. *G10L 15/22* (2013.01); *G10L 25/57* (2013.01); *H04N 21/2187* (2013.01); *G10L 2015/088* (2013.01)

(56) References Cited

FOREIGN PATENT DOCUMENTS

| | | | | |
|---|---|---|---|---|
| CN | 108419138 | A | 8/2018 | |
| CN | 109429075 | A | 3/2019 | |
| CN | 109640112 | A | 4/2019 | |
| CN | 110929094 | A | 3/2020 | |
| EP | 3 579 140 | A1 * | 12/2019 | ............... G06K 9/00 |

* cited by examiner

VIDEO PROCESSING METHOD, LIVE STREAMING PROCESSING METHOD, LIVE STREAMING SYSTEM, ELECTRONIC DEVICE, TERMINAL, AND MEDIUM

The present application claims priority from Chinese invention patent application No. 202010753323.3 titled "VIDEO PROCESSING METHOD, LIVE STREAMING PROCESSING METHOD, LIVE STREAMING SYSTEM, ELECTRONIC DEVICE, TERMINAL, and MEDIUM" filed on Jul. 30, 2020.

TECHNICAL FIELD

The present disclosure relates to the field of video processing, and specifically relates to a video processing method, a live streaming processing method, an electronic apparatus, a live streaming system, a terminal, and a computer-readable storage medium.

BACKGROUND

With the development of computer, video processing, and communication technologies, information technology also affects people's daily lives. For example, people's daily shopping has been developed from physical stores to e-commerce platforms, and then to live streaming platforms. Compared with traditional image-text advertisements, live-stream shopping not only ensures strong interactivity and real-time feedback, but also shortens decision time of consumers and improves the shopping efficiency.

During the live streaming process, in addition to displaying a product in a personal way, an anchor or a host also needs to maintain close interaction with consumers to promote their desire to purchase. When there are too many online consumers in a live streaming room, it is difficult for the anchor to answer questions of all consumers, so that a consumer whose question is not answered exits the live streaming room.

Therefore, answering questions from all consumers has become an urgent technical problem to be solved in the field.

SUMMARY

An object of the present disclosure is to provide a video processing method, a live streaming processing method, an electronic apparatus, a terminal, and a computer-readable storage medium.

As a first aspect of the present disclosure, a video processing method is provided, and the method includes: determining, according to a consulting message, a target short video corresponding to the consulting message; and pushing the target short video to a terminal sending the consulting message.

Optionally, determining, according to the consulting message, the target short video corresponding to the consulting message includes: extracting a keyword from the consulting message; matching the extracted keyword with pieces of feature information of a plurality of short videos stored, such that a short video of the plurality of short videos with a piece of feature information matched with the keyword serves as the target short video.

Optionally, extracting the keyword from the consulting message includes: classifying all received consulting messages into consulting message sets; extracting a keyword for each of the consulting message sets. Pushing the target short video to the terminal sending the consulting message includes: sending a same target video to terminals sending a same consulting message set.

Optionally, prior to determining, according to the consulting message, the target short video corresponding to the consulting message, the video processing method further includes: extracting a plurality of short videos from a played video stream according to the preset pieces of feature information, and storing the plurality of short videos.

Optionally, extracting plurality of short videos from the played video stream according to preset pieces of feature information, and storing the plurality of short video includes: performing a voice recognition process on the video stream; comparing a voice recognition result with the preset pieces of feature information, and determining portions of the video stream corresponding to the pieces of feature information; and storing the portions of the video stream corresponding to the pieces of feature information as the plurality of short videos.

Optionally, in response to that none of the pieces of feature information of the plurality of short videos stored is matched with the extracted keyword, the video processing method further includes: performing a voice recognition process on a played video stream; comparing a voice recognition result with the extracted keyword; and in response to that a word matched with the keyword exists in the voice recognition result, taking a portion of the video stream corresponding to the word as the target short video.

Optionally, the video processing method further includes: generating a prompt message in response to that no word matched with the keyword exists in the voice recognition result.

Optionally, generating the prompt message includes: displaying the consulting message on a screen of a live streaming apparatus.

As a second aspect of the present disclosure, a live streaming processing method is provided, and the method includes: sending a consulting message through a live streaming program; playing, in response to a short video play message corresponding to the consulting message, a corresponding target short video; and returning to the live streaming program in response to a live streaming return message.

Optionally, the live streaming processing method further includes: controlling the live streaming program to enter a background operation state in response to the short video play message.

As a third aspect of the present disclosure, an electronic apparatus is provided, and the electronic apparatus includes: a first storage module having a first executable program stored thereon; and one or more first processors capable of invoking the first executable program to cause the one or more first processors to implement the video processing method according to the first aspect of the present disclosure.

As a fourth aspect of the present disclosure, a live streaming system is provided, and the system includes: an image capturing device configured to capture video information; and the electronic apparatus according to the third aspect of the present disclosure.

As a fifth aspect of the present disclosure, a terminal is provided, and the terminal includes: a second storage module having a second executable program stored thereon; and one or more second processors capable of invoking the second executable program to cause the one or more second processors to implement the live streaming processing method according to the second aspect of the present disclosure.

As a sixth aspect of the present disclosure, a computer-readable storage medium having stored thereon an executable program is provided. When the executable program is invoked, the executable program causes the video processing method according to the first aspect of the present disclosure to be implemented, or causes the live streaming processing method according to the second aspect of the present disclosure to be implemented.

BRIEF DESCRIPTION OF DRAWINGS

Accompanying drawings are provided for further understanding of this disclosure and constitute a part of the specification. Hereinafter, these drawings are intended to explain the disclosure together with the following specific implementations, but should not be considered as a limitation to the present disclosure. In the drawings.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereof.

Figure 1:
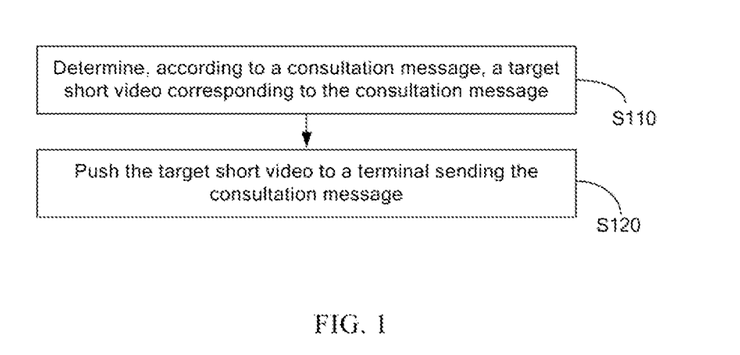
FIG. 1 is a schematic flowchart showing a video processing method according to an embodiment of the present disclosure.

As an aspect of the present disclosure, a video processing method is provided. As shown in FIG. 1, the video processing method includes steps S110 to S120.

At Step S110, a target short video corresponding to a consulting message is determined according to the consulting message.

At Step S120, the target short video is pushed to a terminal sending the consulting message.

The video processing method of the present disclosure is performed by an electronic apparatus at a side of the anchor of the live streaming, and it should be noted that the consulting message is input by a consumer through his/her own terminal and transmitted to the electronic apparatus at the side of the anchor of the live streaming through a communication network.

"The target short video corresponding to the consulting message" means that the content in the short video may answer the question mentioned in the consulting message.

For example, the consulting message may be a message for consulting a discount of a product, and the target short video may be a short video introducing the discount of the product.

In the present disclosure, the consultation of the consumer is replied by pushing the target short video corresponding to the consulting message to the terminal, thereby solving the problem that the anchor cannot answer all consulting messages one by one due to too many consulting messages, enhancing interactivity with the consumer during the live streaming, and improving the experience of the consumer in the live streaming.

In the present disclosure, how to obtain the short video is not particularly limited. For example, a video stream generated during the live streaming may be stored from beginning of the live streaming, and a plurality of short videos may be cut from the stored video stream, or alternatively a short video may be a video introducing a product recorded in advance by the anchor.

The anchor usually introduces the product information and the discount information again and again during the live streaming. Cutting short videos from the video stream generated during the live streaming can decrease the work load of the anchor and other workers and thus the labor cost. Accordingly, as shown in FIG. 2, before step S110, the video processing method may further include step S100.

At Step S100, a video stream generated during the live streaming is stored.

Accordingly, the target short video is cut from the video stream.

Figure 2:
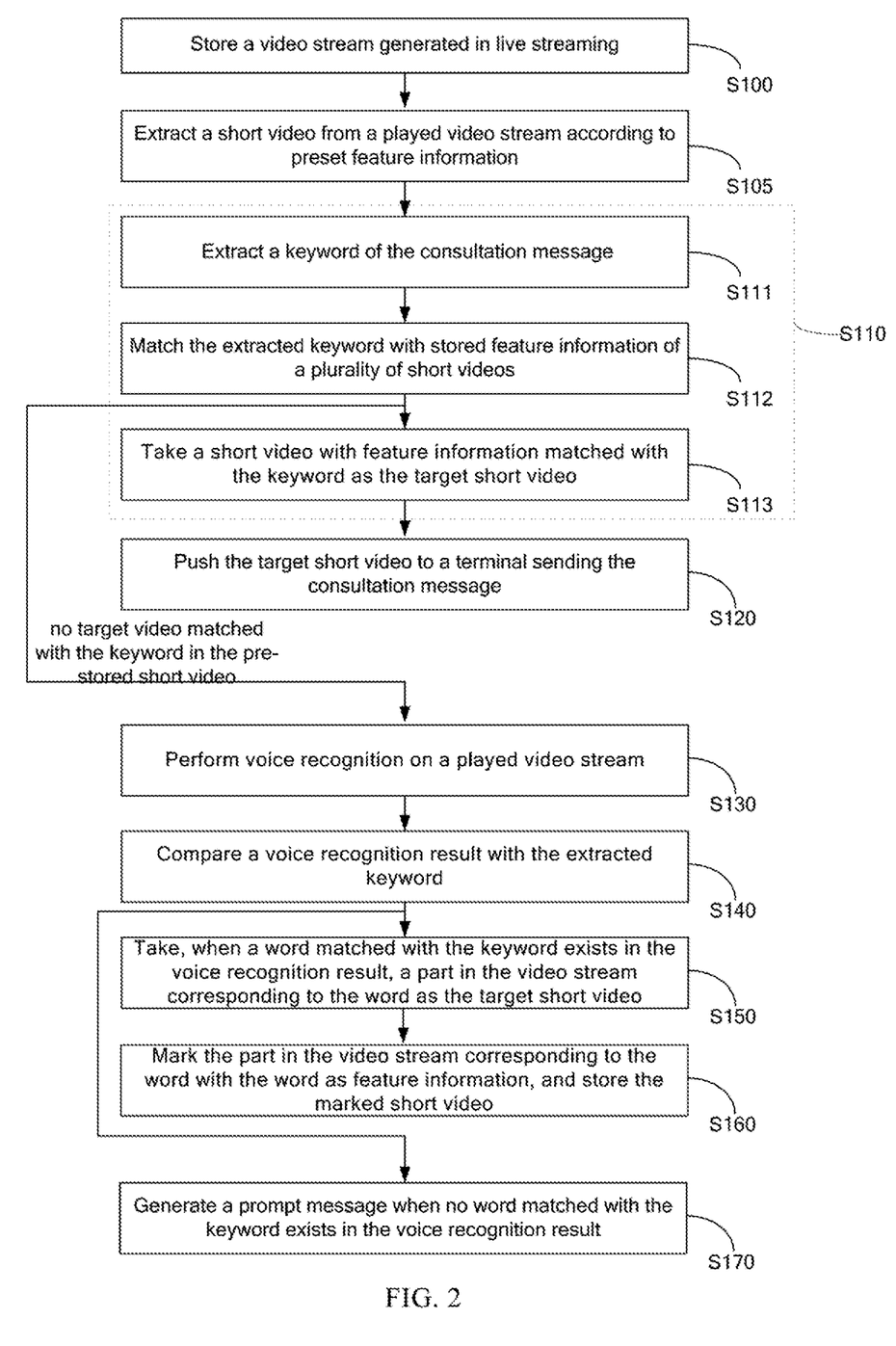
FIG. 2 is a schematic flowchart showing a video processing method according to a second embodiment of the present disclosure.

In the present disclosure, as an optional implementation, as shown in FIG. 2, specifically, step S110 may include steps S111 to S113.

At Step S111, a keyword in the consulting message is extracted.

At Step S112, the extracted keyword is matched with pieces of feature information of a plurality of short videos stored.

At Step S113, a short video with a piece of feature information matched with the keyword serves as the target short video.

The consulting message inputted by a consumer typically includes many useless non-keywords, but the "keyword" in step S111 refers to useful information in the consulting message.

As indicated above, the plurality of short videos are "stored", which means that the plurality of short videos have been stored in the electronic apparatus at the side of the anchor before the keyword is extracted from the consulting message. The short videos may be marked with feature information when the short videos are stored. For example, the feature information related to a product discount of the short video is "discount", and thus the video may be marked with "discount". The feature information related to the product parameter is the feature parameter of the product. For example, when the product is a lipstick, a corresponding feature parameter is "a color number". The product may be marked with a certain color number. It should be noted that a same short video may correspond to many different pieces of feature information. For example, if a same short video includes discount information of a lipstick with a certain color number, and then the same short video may be marked with both of the color number of the lipstick and the discount information as feature information.

For example, the consulting message input by the consumer may include that "what is the discount?" in which "discount" is the keyword, and all the remaining words are non-keywords or modal particles.

At step S112, the extracted keyword "discount" may be matched with the pieces of feature information of the plurality of short videos, and at step S113, a short video with feature information including "discount" is pushed to a terminal of the consumer as the target short video.

For another example, a consulting message input by a consumer may include that "what is the discount of the lipstick with the color number 105?" in which "105" and "discount" are keywords, and all the remaining words are non-keywords. At step S112, the extracted keywords "105" and "discount" may be matched with the pieces of feature information of the plurality of short videos. At step S113, a short video with a pieces of feature information including both "105" and "discount" is pushed to a terminal of the consumer as the target short video.

It should be noted that the longer the keywords, the higher the matching accuracy. For example, when multiple types of products are sold in a live streaming, each product has corresponding discount information, and different products may have different discount information. For example, a product with a model 105 has a different discount from a product with a model 106. When a consumer asks a question, the question involves discount information of the product with a model he/she is interested in. Therefore, the consumer typically sends out the consulting message regarding both the model and the discount. In view of this, the product's model and the question (which may include a discount) may be contained in the extracted keywords of the consulting message.

Figure 3:
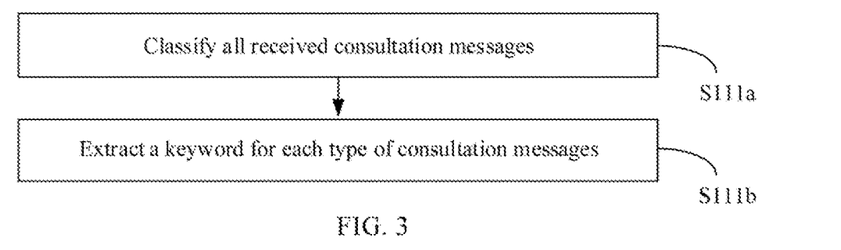
FIG. 3 is a flowchart showing step S111 according to an embodiment of the present disclosure.

Consumers tend to pay attention to substantially similar information when they are watching the live streaming. For example, most consumers are interested in several categories of information, such as discount information, the model of the product, and purchase methods. In order to quickly reply to the consumers' consultations, optionally, as shown in FIG. 3, step S111 may include steps 111a and 111b.

At Step S111a, all received consulting messages are classified into consulting message sets.

At Step S111b, keywords of the consulting message sets are extracted.

Accordingly, at step S120, a same target video is sent to terminals sending a same consulting message set.

In the present disclosure, step S111a is not particularly limited. For example, most consulting messages sent by the consumers are text. After the consulting messages of the consumers are received, messages with 80% similar text content are classified into a same consulting message set. Apparently, the threshold of the text content similarity is not particularly limited in the present disclosure, and may be 80% or 90%, as long as it is in the range from 70% to 99%. The higher the threshold, the finer the classification, the more targeted the question of the consumer can be answered.

The classification of the consulting messages can improve an efficiency for pushing the target short video to the consumer, thereby facilitating real-time answering the question of the consumer, improving the interactive experience with the consumer, and increasing the probability of selling the product.

Optionally, the consulting messages may be classified according to discount consultation, rewarding, the information of the consulted product, and the like.

As described above, the target short video is cut from the video stream generated during the live streaming. Accordingly, prior to the step of determining, according to the consulting message, the target short video corresponding to the consulting message, as shown in FIG. 2, the video processing method further includes step S105.

At Step S105, a short video is extracted from a played video stream according to preset feature information.

In the present disclosure, step S105 is not particularly limited. For example, the anchor may be provided with a script before the live streaming, and asked to speak out the desired information in some specific time periods. For example, the parameters and the discount information of the product are introduced in the first five minutes after the beginning of the live streaming. The features and the discount information of the product and the like are introduced every 20 minutes, and then after the live video stream is stored, the short videos are cut out at predetermined time points, and then marked with the feature information.

In the present disclosure, the presetting of the feature information is not particularly limited. As an optional implementation, questions frequently asked (e.g., the questions being asked for 10 times per minute) may be determined from a history live streaming record according to big data, and the "feature information" may be set for the questions frequently asked. When the "feature information" appears in the live video stream, a short video is cut out and stored. When a consumer sends a consulting message, the keyword in the consulting message may be directly used for matching.

Figure 4:
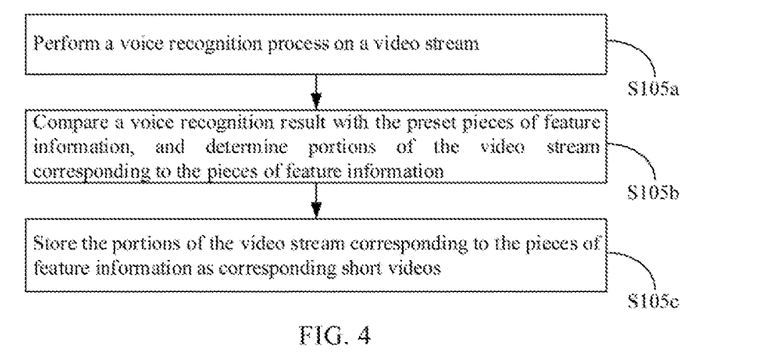
FIG. 4 is a flowchart showing step S105 according to an embodiment of the present disclosure.

It is well known that many hosts have their distinct personal characteristics, and the script may limit the live broadcast of the host. Therefore, many hosts conduct live streaming without any script. Accordingly, as shown in FIG. 4, step S105 may include steps S105a to S105c.

At Step S105a, a voice recognition process is performed on a video stream.

At Step S105b, a voice recognition result is compared with the pieces of preset feature information, so as to determine portions of the video stream corresponding to the pieces of feature information.

At Step S105c, the portions of the video stream corresponding to the pieces of feature information are stored as the short videos.

As an optional implementation, step S105b may specifically include determining a start time point and an ending time point of each of the portions of the video stream corresponding to the pieces of feature information. The portions of the video stream corresponding to the pieces of feature information are obtained by cutting each of the portions of the video stream between the corresponding start time points and the ending time points.

The forgoing method is applicable to the case where a target video exists in the short videos stored in advance. When no target video matched with the keyword exists in the short videos stored in advance, as shown in FIG. 2, the video processing method may further include steps S130 to S160.

At Step S130, a voice recognition process is performed on a played video stream.

At Step S140, a result of the voice recognition is compared with the extracted keyword.

At Step S150, when a word matched with the keyword exists in the result of the voice recognition, a portion of the video stream corresponding to the word serves as the target short video.

At Step S160, the portion of the video stream corresponding to the word is marked with the word as the feature information, and the marked short video is stored.

In the present disclosure, step S150 may specifically include determining a start time point and an ending time point of the portion of the video stream corresponding to the word, and taking the portion of the video stream between the start time point and the ending time point as the target short video. Step S160 may specifically include marking, with the word as the feature information, a short video between the start time point and the ending time point of the video stream corresponding the word, and storing the marked short video.

If the stored short videos are regarded as material, step S160 is equivalent to supplementing the material library.

Obviously, if the target short video still cannot be obtained after steps S130 to S140 are performed, the host needs to directly answer the question.

Accordingly, as shown in FIG. 2, the processing method may further include a step S170.

At Step S170, a prompt message is generated, when no word matched with the keyword exists in the result of the voice recognition.

With steps S110 to S160, the probability of performing step S170 and thus the workload of the anchor can be reduced, so that the anchor can better focus on introducing the product.

The prompt message may remind the anchor or other workers to reply to the consulting message. In the present disclosure, the detailed form of the prompt message is not particularly limited. For example, generating the prompt message may include: displaying the consulting message on a screen of an apparatus on which a live streaming is conducting.

As an optional implementation, only a consulting message that cannot be automatically matched with the target video is displayed on the screen of the apparatus on which a live streaming is holding/conducting.

As another optional implementation, all consulting messages are displayed on the screen of the live streaming apparatus. A consulting message that cannot be automatically matched with the target video may be displayed in a different color or font from the consulting message that can be automatically matched with the target video, so that the anchor can timely identify the corresponding consulting message. Apparently, other identification information may be added to the consulting message that cannot be automatically matched with the target video, so that the anchor can timely identify the consulting message and answer the question.

In addition to addressing consulting messages, the video processing method of the present disclosure may further include: processing an initial video captured by an image capturing device to obtain a live video stream.

The processing on the initial video may include at least one of a filtering process, a retouching process, an image enhancement process, an audio noise reduction process, or the like, so as to improve presentation effect of the live video stream.

The live video stream is pushed to the client terminals after the live video stream is obtained.

Figure 5:
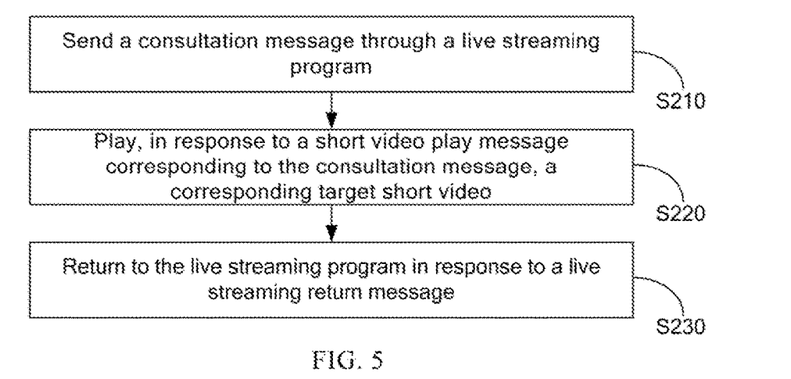
FIG. 5 is a flowchart showing a live streaming processing method according to an embodiment of the present disclosure.

As a second aspect of the present disclosure, a live streaming processing method is provided. As shown in FIG. 5, the live streaming processing method may include steps S210 to S230.

At Step S210, a consulting message is sent through a live streaming program.

At Step S220, in response to a short video play message corresponding to the consulting message, a corresponding target short video is played.

At Step S230, the current display returns to the live streaming program from the corresponding target short video, in response to a live streaming return message.

The live streaming processing method according to the present disclosure is performed by a user terminal. When the short video is played, the live streaming program may be operated in a background, or alternatively the live streaming program may directly exit.

In the present disclosure, the specific type of the live streaming return message is not particularly limited. For example, the live streaming return message may be an ending message after the short video is finished, or an ending message generated when a consumer closes the short video through the user terminal.

The consumer will return to the live streaming program immediately after the target short video is stopped playing, so that the consumer can continue to watch the live streaming.

Figure 6:
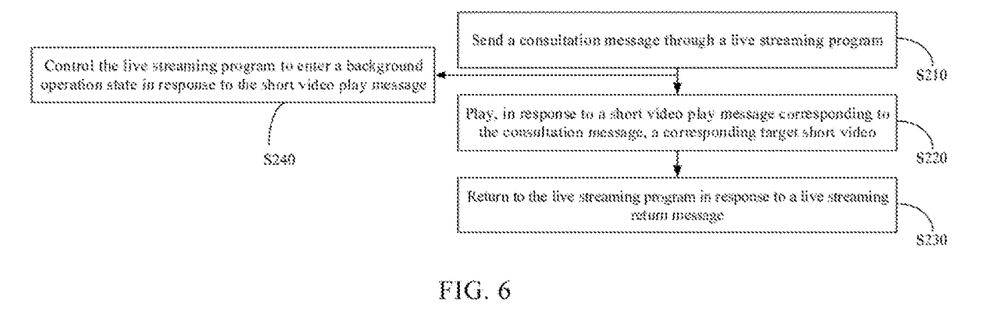
FIG. 6 is a flowchart showing a live streaming processing method according to another embodiment of the present disclosure.

In order to enable the consumer to quickly return to the live streaming room, optionally, as shown in FIG. 6, the live streaming processing method further includes a step S240.

At Step S240, the live streaming program is controlled to enter a background operation state in response to the short video play message.

As a third aspect of the present disclosure, an electronic apparatus provided. The electronic apparatus includes: a first storage module having a first executable program stored thereon; and one or more first processors capable of invoking the first executable program to cause the one or more first processors to implement the video processing method according to the first aspect of the present disclosure.

The electronic apparatus is disposed at the side of the host or anchor and configured to process a video stream generated during the live streaming. As described above, in the present disclosure, the consultation of the consumer is replied by pushing a target short video corresponding to the consulting message to the terminal, thereby solving the problem that the anchor cannot answer all consulting messages one by one in the case of too many consulting messages, enhancing interactivity with the consumer during the live streaming, and improving the experience of the consumer in the live streaming.

The electronic apparatus may further include one or more first I/O interfaces connected between the one or more first processors and the first storage module and configured to implement information interaction between the one or more first processors and the first storage module.

Each of the first processors is a device with a data processing capability, including but not limited to, a central processing unit (CPU) or the like; and the first storage module is a device with a data storage capability, including but not limited to, a random access memory (RAM, more specifically SDRAM, DDR, etc.), a read only memory (ROM), an electrically erasable programmable read only memory (EEPROM) or a flash memory (FLASH).

The one or more first I/O interfaces, including but not limited to data buses, are connected between the one or more first processors and the first storage module, and configured to implement information interaction between the one or more first processors and the first storage module.

In some embodiments, the one or more first processors, the first storage module, and the one or more first I/O interfaces are interconnected via a bus, and thus are further connected to other components of a display terminal.

As a fourth aspect of the present disclosure, a live streaming system is provided. The live streaming system includes: an image capturing device configured to capture video information; and the electronic apparatus as described above in the present disclosure.

In the present disclosure, the image capturing device may be externally connected to the electronic apparatus, and video information captured by the electronic apparatus is the initial video stream for live streaming, and the video information captured by the electronic apparatus is also a video material to be processed by the electronic apparatus.

In the present disclosure, the image capturing device may be a professional video camera or a camera. In the case of a camera, the image capturing device may be integrated in the electronic apparatus. Accordingly, the electronic apparatus may further include a display panel configured to display the live video stream and consulting messages from consumers.

As an optional implementation, the image capturing device includes a main camera device and an auxiliary camera device. The main camera device is configured to capture front video images of an anchor, and the auxiliary camera device is configured to capture video images of the anchor at other orientations in the live streaming in an omni-directional manner. The 360° omni-directional video image capturing can be realized by distributing a plurality of cameras at multiple angles or be realized by a mobile video robot. During the live streaming, the mobile video robot automatically moves to realize omni-directional video image capturing without interfering with the anchor. The mobile video robot is preferred in the present disclosure. If the anchor is sitting during the live streaming with a relatively small movement range, the mobile video robot may move along a preset path to complete the 360° omni-directional video image capturing. If the anchor moves in a relatively large movement range during the live streaming (such as a live streaming for clothes), the mobile video robot may automatically move around circularly and repeatedly with the anchor as a reference center, thereby implementing the 360° omni-directional video image capturing.

Figure 7:
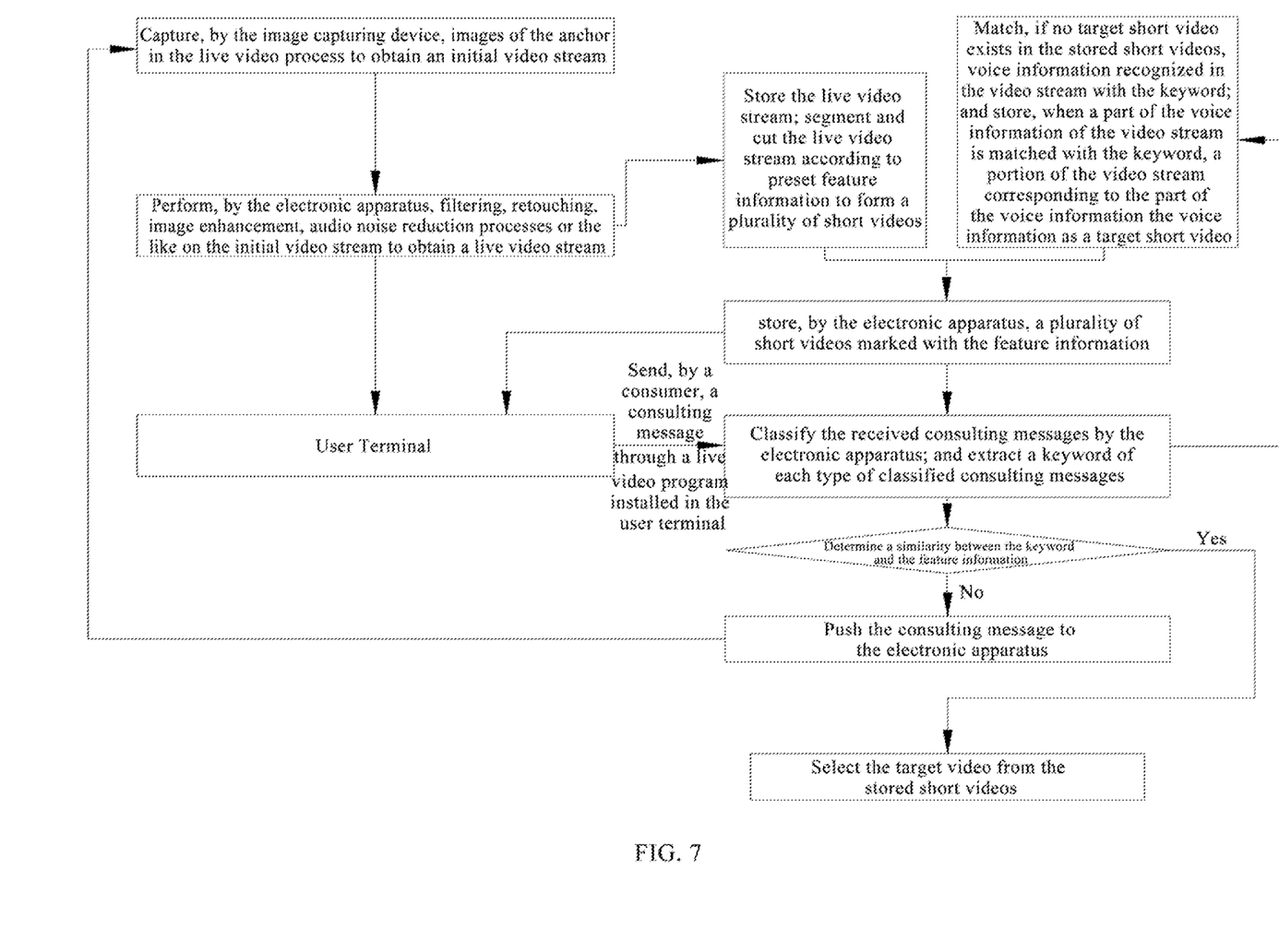
FIG. 7 is a flowchart showing a live streaming system according to the present disclosure.

The live streaming process using the live streaming system of the present disclosure is briefly described below with reference to FIG. 7. The whole live streaming process includes:

capturing, by an image capturing device, images of an anchor during the live streaming process to obtain an initial video stream;

performing, by an electronic apparatus, processes such as a filtering process, a retouching process, an image enhancement process, an audio noise reduction process or the like on the initial video stream to obtain a live video stream;

pushing the live video stream to a user terminal;

storing the live video stream while pushing the live video stream to the user terminal;

segmenting and cutting the live video stream according to preset feature information to form a plurality of short videos;

sending, by a consumer, a consulting message through a live streaming program installed in the user terminal;

classifying, by the electronic apparatus, the received consulting messages into consulting message sets;

extracting a keyword for each of the consulting messages sets;

matching the keyword with feature information of the stored short videos (to determine a similarity between the keyword and the feature information);

pushing information with feature information matched with the keyword as a target short video to a corresponding terminal;

matching, if no target short video exists in the stored short videos, the keyword with voice information recognized from the video stream;

storing when the voice information of the video stream has a part matched with the keyword, a video stream segment of the video stream corresponding to the part of the voice information as a target short video, and pushing the target short video to the user terminal; and pushing, when the voice information of video stream has no part matched with the keyword, the consulting message to a display apparatus on the side of the anchor.

As a fifth aspect of the present disclosure, a terminal is provided. The terminal includes: a second storage module having a second executable program stored thereon; and one or more second processors capable of invoking the second executable program to cause the one or more second processors to implement the live streaming processing method according to the second aspect of the present disclosure.

In the present disclosure, the terminal is a terminal used by a consumer. With this terminal, live streaming can be sent and watched, a consulting message can be sent, and a target short video corresponding to the consulting message can be played.

The terminal may further include one or more second I/O interfaces connected between the one or more second processors and the second storage module and configured to implement information interaction between the one or more second processors and the second storage module.

Each of the second processors is a device with a data processing capability, including but not limited to a central processing unit (CPU) or the like; and the first storage module is a device with a data storage capability, including but not limited to a random access memory (RAM, more specifically SDRAM, DDR, etc.), a read only memory (ROM), an electrically erasable programmable read only memory (EEPROM) or a flash memory (FLASH).

The one or more second I/O interfaces, including but not limited to data buses, are connected between the one or more second processors and the second storage module, and can implement information interaction between the one or more second processors and the second storage module.

In some embodiments, the one or more second processors, the second storage module, and the one or more second I/O interfaces are interconnected via a bus, and thus are further connected to other components of a display terminal.

As a sixth aspect of the present disclosure, there is provided a computer-readable storage medium having stored thereon an executable program which, when invoked, causes the video processing method according to the first aspect of the present disclosure to be implemented, or causes the live streaming processing method according to the second aspect of the present disclosure to be implemented.

Those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or step may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to one of ordinary skill in the art that a communication medium typically includes a computer-readable instruction, a data structure, a program module, or other data in a modulated data signal, such as a carrier wave or other transport mechanism, and may include any information delivery medium.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A video processing method, comprising:
    determining, according to a consulting message, a target short video corresponding to the consulting message; and
    pushing the target short video to a terminal sending the consulting message, wherein
    determining, according to the consulting message, the target short video corresponding to the consulting message comprises: extracting a keyword from the consulting message; and matching the extracted keyword with pieces of feature information of a plurality of short videos stored, such that a short video of the plurality of short videos with a pieces of feature information matched with the keyword serves as the target short video,
    extracting the keyword from the consulting message comprises: classifying all received consulting messages into consulting message sets; and extracting a keyword for each of the consulting message set; and
    pushing the target short video to the terminal sending the consulting message comprises: sending a same target video to terminals sending a same consulting message set.

2. The video processing method according to claim 1, wherein prior to determining, according to the consulting message, the target short video corresponding to the consulting message, the video processing method further comprises:
    extracting a plurality of short videos from a played video stream according to the preset pieces of feature information, and storing the plurality of short videos.

3. The video processing method according to claim 2, wherein extracting the plurality of short videos from the played video stream according to the preset pieces of feature information, and storing the plurality of short videos comprises:
    performing a voice recognition process on the video stream;
    comparing a voice recognition result with the preset pieces of feature information, and determining portions of the video stream corresponding to the pieces of feature information; and
    storing the portions of the video stream corresponding to the pieces of feature information as the plurality of short videos.

4. The video processing method according to claim 1, wherein in response to that none of the pieces of feature information of the plurality of stored short videos is matched with the extracted keyword, the video processing method further comprises:
    performing a voice recognition process on a played video stream;
    comparing a voice recognition result with the extracted keyword;
    in response to that a word in the voice recognition result is matched with the keyword, taking a portion of the video stream corresponding to the word as the target short video; and
    marking, with the word as feature information, the portion of the video stream corresponding to the word, and storing the marked short video.

5. The video processing method according to claim 4, further comprising:
    generating a prompt message in response to that no word in the voice recognition result is matched with the keyword.

6. The video processing method according to claim 5, wherein generating the prompt message comprises:
    displaying the consulting message on a screen of a live streaming apparatus.

7. The video processing method according to claim 2, wherein in response to that none of the pieces of feature information of the plurality of stored short videos is matched with the extracted keyword, the video processing method further comprises:
    performing a voice recognition process on a played video stream;
    comparing a voice recognition result with the extracted keyword;
    in response to that a word in the voice recognition result is matched with the keyword, taking a portion of the video stream corresponding to the word as the target short video; and
    marking, with the word as feature information, the portion of the video stream corresponding to the word, and storing the marked short video.

8. The video processing method according to claim 3, wherein in response to that none of the pieces of feature information of the plurality of stored short videos is matched with the extracted keyword, the video processing method further comprises:
    performing a voice recognition process on a played video stream;
    comparing a voice recognition result with the extracted keyword;
    in response to that a word in the voice recognition result is matched with the keyword, taking a portion of the video stream corresponding to the word as the target short video; and marking, with the word as feature information, the portion of the video stream corresponding to the word, and storing the marked short video.

9. An electronic apparatus, comprising:
a first storage module having a first executable program stored thereon; and
one or more first processors capable of invoking the first executable program to cause the one or more first processors to implement a video processing method comprising:
determining, according to a consulting message, a target short video corresponding to the consulting message; and
pushing the target short video to a terminal sending the consulting message, wherein
determining, according to the consulting message, the target short video corresponding to the consulting message comprises: extracting a keyword from the consulting message; and matching the extracted keyword with pieces of feature information of a plurality of short videos stored, such that a short video of the plurality of short videos with a pieces of feature information matched with the keyword serves as the target short video,
extracting the keyword from the consulting message comprises: classifying all received consulting messages into consulting message sets; and extracting a keyword for each of the consulting message set; and
pushing the target short video to the terminal sending the consulting message comprises: sending a same target video to terminals sending a same consulting message set.

10. A live streaming system, comprising:
an image capturing device configured to capture video information; and
the electronic apparatus comprising:
a first storage module having a first executable program stored thereon; and
one or more first processors capable of invoking the first executable program to cause the one or more first processors to implement a video processing method comprising:
determining, according to a consulting message, a target short video corresponding to the consulting message; and
pushing the target short video to a terminal sending the consulting message, wherein
determining, according to the consulting message, the target short video corresponding to the consulting message comprises: extracting a keyword from the consulting message; and matching the extracted keyword with pieces of feature information of a plurality of short videos stored, such that a short video of the plurality of short videos with a pieces of feature information matched with the keyword serves as the target short video,
extracting the keyword from the consulting message comprises: classifying all received consulting messages into consulting message sets; and extracting a keyword for each of the consulting message set; and
pushing the target short video to the terminal sending the consulting message comprises: sending a same target video to terminals sending a same consulting message set.

11. A non-transitory computer-readable storage medium storing instructions which, when executed by a processor, cause the processor to perform the video processing method according to claim 1.

* * * * *